Patented Feb. 19, 1952

2,586,323

UNITED STATES PATENT OFFICE 2,586,323

INHIBITING CORROSION OF ALUMINUM CHLORIDE - HYDROCARBON COMPLEX LIQUID IN PRESENCE OF HCl PROMOTER WITH IODINE COMPOUNDS

William F. Glassmire and William R. Smith, Port Arthur, Tex., assignors to The Texas Company, New York, N. Y., a corporation of Delaware No Drawing. Application May 27, 1948, Serial No. 29,654

9 Claims. (Cl. 260—666)

This invention relates to the inhibition of corrosion in catalytic reactions employing an aluminum chloride-hydrocarbon complex liquid catalyst with a hydrogen chloride promoter.

One of the principal objects of the present invention is to provide an improved inhibitor which is effective in relatively small concentrations in the complex catalyst liquid within the conversion zone to inhibit the normal corrosive action of that catalyst liquid on ferrous metal-containing surfaces of the reactor and lines.

Other objects and advantages of the present invention will be apparent from the following description and the appended claims.

Aluminum chloride catalyst in the form of a liquid aluminum chloride-hydrocarbon complex containing free or uncombined aluminum chloride dissolved or suspended therein constitutes a highly effective catalyst for carrying out conversion of hydrocarbons by processes such as isomerization, alkylation, polymerization, reforming and the like. For example, in catalytic isomerization of a non-aromatic saturated hydrocarbon, such as a normal paraffin or naphthene, a highly successful process involves dispersing the hydrocarbon in liquid droplets through a distributor plate positioned near the base of a ferrous metal tower containing a large body of the aluminum chloride-hydrocarbon complex liquid catalyst and in the presence of hydrogen chloride promoter. The dispersed droplets of the hydrocarbon rise upwardly through the body of catalyst liquid maintained at a temperature of the order of 150–250° F., and undergo isomerization during passage therethrough. The dispersed droplets coalesce into a liquid hydrocarbon isomate layer on the upper surface of the catalyst liquid, from which a stream of the resulting isomate is continuously withdrawn. Fresh aluminum chloride is continuously or intermittently added to the conversion zone, such as by being dissolved in a portion of the hydrocarbon feed, so as to maintain free or uncombined aluminum chloride in the catalyst liquid with resulting high activity of the catalyst. This process is highly effective for the isomerization of normal butane to isobutane.

A disadvantage of the process has been the rapid corrosive attack of the catalyst liquid on the metal of the reaction vessel or tower, as well as the distributor plate and lines with which that catalyst liquid comes in direct contact. This corrosive action was so serious as to require frequent shut-downs for replacement; and various expedients to combat the corrosive action were tried. The attempt to use corrosion resistant linings, such as plastic, were not wholly successful due to deterioration and cracking in service with ultimate exposure of the metal to attack.

In accordance with the present invention, this corrosive action of the aluminum chloride-hydrocarbon complex liquid catalyst in the presence of hydrogen chloride promoter is effectively minimized or inhibited by maintaining in the catalyst liquid within the conversion zone about 0.2–2.0% by weight of iodine or iodine-containing compounds. The element iodine has been found to be highly effective as an anti-corrosive for this service when used in relatively low concentration. Likewise, various compounds containing iodine, particularly the inorganic and organic iodides are also highly effective. Of the inorganic iodides, the various metallic iodides and hydrogen iodide can be used. Of the organic iodides, the various alkyl, aryl, aralkyl, alkaryl and cycloalkyl iodides can be employed. In this respect, iodine and the iodine-containing compounds are many times more effective than the other halogens or corresponding halogen-containing compounds.

In order to test the effectiveness of various inhibitors for purposes of the present invention, a standard test procedure was developed. In this test procedure, three test specimens, such as boiler steel strips, are carefully ground on a power driven emery belt, then scoured with a commercial cleaner and steel wool, and finally thoroughly rinsed with water and methyl ethyl ketone. The specimens are then weighed and promptly placed in an 800 ml. beaker filled with the complex liquid to a depth of about 4 inches, the temperature of which had been brought up to 210° F. The test specimens are inserted through a slotted phenol-formaldehyde plastic cover which serves to protect the complex from the atmosphere, the specimens resting on the bottom of the beaker and held in vertical position by the slotted plastic cover. At the end of five hours exposure, the specimens are removed, plunged into water, rinsed with methyl ethyl ketone, scrubbed lightly with the commercial cleaner and steel wool to remove small amounts of carbonaceous material adhering to the test strips, again rinsed with water and methyl ethyl ketone, dried and immediately weighed. A beaker containing the uninhibited complex liquid is employed for the control samples along with another beaker containing the same complex liquid containing the added inhibitor.

In the following table, the loss in weight of the three strips are averaged in reporting the corrosion rate as penetration in inches per year for the control sample and the inhibited sample. In this test, an active aluminum chloride-hydrocarbon complex liquid, such as a kerosene or alkylate complex, containing added uncombined aluminum chloride so as to be comparable to a highly effective isomerization catalyst, was employed. The table sets forth the results obtained by the foregoing standard procedure on a large number of inhibitors employed in the weight per cent concentration based on the catalyst liquid as indicated.

Table

| Inhibitor | Conc. Wt. Per Cent | Control Sample Pen. in./yr. | Inhibited Sample Pen. in./yr. |
|---|---|---|---|
| Iodine | 0.54 | 2.31 | 0.04 |
| Bromine | 1.0 | 1.89 | 1.34 |
| Chlorine | [1]2.0 | 1.89 | 2.03 |
| KI | 1.0 | 2.17 | 0.10 |
| $ZnI_2$ | 1.0 | 1.89 | 0.15 |
| HI | [1]2.0 | 1.89 | 0.23 |
| Butyl iodide | 1.0 | 1.89 | 0.38 |
| $CCl_4$ | 12.5 | 2.31 | 0.35 |
| $CrCl_3$ | 1.0 | 2.46 | 2.20 |
| $CuCl_2$ | 0.63 | 2.84 | 2.80 |
| $FeCl_3$ | 4.63 | 2.38 | 0.21 |
| $FeCl_3$ | 1.0 | 2.57 | 1.97 |
| $ZnCl_2$ | 5.94 | 2.38 | 0.32 |
| $ZnBr_2$ | 1.0 | 1.89 | 1.16 |
| Iodoform | 1.0 | 1.89 | 0.36 |
| Trichloroethylene | 1.0 | 1.89 | 2.15 |
| Chloroform | 1.0 | 1.89 | 2.14 |
| S-Tetrabromoethane | 1.0 | 1.89 | 1.06 |
| Benzene | 2.0 | 2.53 | 2.55 |
| Iodobenzene | 1.0 | 1.89 | 0.28 |
| Chlorobenzene | 1.0 | 1.89 | 1.86 |
| 1,2,4-Trichlorobenzene | 1.0 | 1.89 | 1.99 |
| p-Chloroaniline | 1.0 | 1.89 | 1.78 |

[1] Total amount bubbled through sample.

It is noted from the foregoing table that iodine in about ½% concentration is more than 30 times as effective as bromine and nearly twice again as effective as chlorine, with the latter two used in higher proportion. Likewise, the metallic iodides, such as zinc iodide, in a proportion of about 1% by weight are many times more effective than the corresponding metal bromides or chlorides when employed in the same relatively low concentration, and are more than twice as effective as the metallic chlorides when the latter are used in a large proportion of the order of 4-6%. The alkyl iodides, for example iodoform, and the aryl iodides, for example iodobenzene, are likewise many times more effective than the corresponding alkyl and aryl chlorides when employed in the desired relatively low proportion range.

It has been previously proposed to employ certain elements or metals, including antimony and arsenic, as well as various compounds of these elements including the chlorides, fluorides and bromides, as inhibitors for a complex catalyst liquid of this character. However, the use of iodides for this purpose was not suggested. Moreover, it has been previously proposed to employ alkali metal or alkaline earth halides, particularly the chlorides, in a relatively large concentration of the order of about 6% by weight or more for this purpose. Here again, the iodides were not specifically suggested; and it appears evident that the superior inhibitive action of iodine and the iodine containing compounds in an aluminum chloride-hydrocarbon complex liquid catalyst of this character has not heretofore been appreciated or discovered.

Apart from the desirability of employing the inhibitor in a relatively small proportion from the standpoint of economy as well as avoiding a recovery problem and difficulties in the reaction zone, it is pointed out that there is a further advantage in a continuous catalytic process where the catalyst liquid within the reaction zone is fortified continuously or intermittently by the addition of free aluminum chloride. Thus, it has been found that inhibitors of the character of zinc chloride and ferric chloride, which require a concentration of the order of at least about 5-6% by weight to attain effective inhibiting action, largely lose their effectiveness when the complex liquid is fortified with additional aluminum chloride. On the other hand, an active inhibiting material which can be employed in a relatively small concentration has been found to be substantially unaffected by or less sensitive to the fortification procedure, which means that the amount of make-up inhibitor required during continuous operation over long periods of time is reduced.

While various aluminum halides together with hydrogen halides, such as hydrogen iodide, have previously been proposed for effecting catalytic reactions of this character, only aluminum chloride or aluminum bromide together with the corresponding hydrogen or alkyl halides as promoter have achieved any substantial commercial use. The present invention is distinguished by involving the specific aluminum chloride-hydrocarbon complex liquid catalyst together with hydrogen chloride as the promoter, and in addition employing iodine or an iodine-containing compound in the small proportion range set forth for the different purpose of inhibiting the normal corrosive action of this particular aluminum chloride complex catalyst liquid.

Obviously many modifications and variations of the invention, as hereinbefore set forth, may be made without departing from the spirit and scope thereof, and therefore only such limitations should be imposed as are indicated in the appended claims.

We claim:

1. An aluminum chloride-hydrocarbon complex liquid catalyst for hydrocarbon conversion reactions consisting of a preformed aluminum chloride-hydrocarbon complex containing added uncombined aluminum chloride and hydrogen chloride, and also containing about 0.2-2.0% by weight of an added iodine-containing corrosion inhibitor composed only of non-metal atoms and selected from the group consisting of iodine, hydrogen iodide and hydrocarbon iodides capable of inhibiting attack of the catalyst liquid on ferrous metal surfaces.

2. In a catalytic hydrocarbon conversion process wherein hydrocarbons are converted in the presence of an aluminum chloride-hydrocarbon complex liquid catalyst and hydrogen chloride promoter in a conversion zone comprising a metal-containing surface in direct contact with the catalyst liquid and normally subject to objectionable corrosion, the improvement which comprises incorporating in said catalyst liquid iodine in an amount of 0.2 to 2.0% by weight based on the catalyst liquid sufficient to inhibit said corrosion.

3. In a catalytic hydrocarbon conversion process wherein hydrocarbons are converted in the presence of an aluminum chloride-hydrocarbon complex liquid catalyst and hydrogen chloride promoter in a conversion zone comprising a metal-containing surface in direct contact with the catalyst liquid and normally subject to objectionable corrosion, the improvement which comprises incorporating in said catalyst liquid an iodine-containing corrosion inhibitor composed only of non-metal atoms and selected from the group consisting of iodine, hydrogen iodide and hydrocarbon iodides in an amount of 0.2 to 2.0% by weight based on the catalyst liquid effective to inhibit said corrosion.

4. The method according to claim 3, wherein the corrosion inhibitor is an alkyl iodide.

5. The method according to claim 3, wherein the corrosion inhibitor is an aryl iodide.

6. The method according to claim 3, wherein the corrosion inhibitor is butyl iodide.

7. The method according to claim 3, wherein the corrosion inhibitor is iodoform.

8. The method according to claim 3, wherein the corrosion inhibitor is iodobenzene.

9. The method according to claim 3, wherein the corrosion inhibitor is hydrogen iodide.

WILLIAM F. GLASSMIRE.
WILLIAM R. SMITH.

REFERENCES CITED

The following references are of record in the file of this patent:

UNITED STATES PATENTS

| Number | Name | Date |
| --- | --- | --- |
| 2,382,753 | Treseder | Aug. 14, 1945 |
| 2,411,483 | Wachter et al. | Nov. 19, 1946 |
| 2,420,386 | Smith et al. | May 13, 1947 |